United States Patent [19]

Newman

[11] Patent Number: 4,682,307

[45] Date of Patent: Jul. 21, 1987

[54] UNDERWATER SEISMIC TESTING

[75] Inventor: Paul Newman, Westerham, United Kingdom

[73] Assignee: Horizon Exploration Limited, Swanley, United Kingdom

[21] Appl. No.: 642,840

[22] Filed: Aug. 21, 1984

[51] Int. Cl.$^4$ .............................................. G01V 1/38
[52] U.S. Cl. ......................................... 367/21; 181/110
[58] Field of Search .................. 181/108, 110; 367/14, 367/15, 21, 53, 54, 38

[56] References Cited

U.S. PATENT DOCUMENTS 3,574,462 3/1971 Gray ........................................ 367/21
4,516,227 5/1985 Wener et al. ......................... 181/110

OTHER PUBLICATIONS

Backus, Water Reverberations–Their Nature and Elimination, Geophysics, vol. XXIV, No. 2 (Apr., 1959), pp. 233–261.
Robinson, Predictive Decomposition of Time Series with Application to Seismic Exploration, Geophysics, vol. XXXII, No. 3 (Jun. 1967), pp. 418–484.
Peacock/Treitel, Predictive Deconvolution: Theory and Practice, Geophysics, vol. 34, No. 2, (Apr. 1969), pp. 155–169.
Schneider, Integral Formulation for Migration in Two and Three Dimensions, Geophysics, vol. 43, No. 1 (Feb., 1978), pp. 49–76.
Newman/White, Application of 3-D Seismics to Shallow Reef Delineation, Summary of Material Presented 1981.
Newman, 3-D Acoustic Model Experiments, Summary of material (not dated).

Primary Examiner—Thomas H. Tarcza
Assistant Examiner—Ian J. Lobo
Attorney, Agent, or Firm—Merchant, Gould, Smith, Edell, Welter & Schmidt

[57] ABSTRACT

A method of underwater seismic testing is disclosed which does not require the use of long hydrophone streamers and which dispenses with the conventional CDP stack technique. The method enables signal processing to commence as soon as the first shot has been fired. The method involves traversing the region of interest with a survey vessel while firing a single seismic source repeatedly and observing the sub-sea response to the repeated shots using a single seismic receiver to provide thereby single-trace data which is then processed to generate the required sub-sea geological data. The signal processing may be effected in two stages, the first being deconvolution and the second being "3-D" imaging, preferably using the Kirchoff integral formulation.

3 Claims, 8 Drawing Figures

MIGRATION RANGE, $d = \dfrac{x^2}{4T_0 V} \sin 2\theta$

Fig. 3. MIGRATION AFTER STACK

Fig. 5.

MIGRATION RANGE, $d = \dfrac{x^2}{4T_0 V} \sin 2\theta$

Fig. 6 B.

SEIS CUBE DISPLAY
FRONT FACE LINE 11A. TOP SURFACE 154 MS

Fig. 7.

UNDERWATER SEISMIC TESTING

This invention relates to underwater seismic testing.

Figure 1:
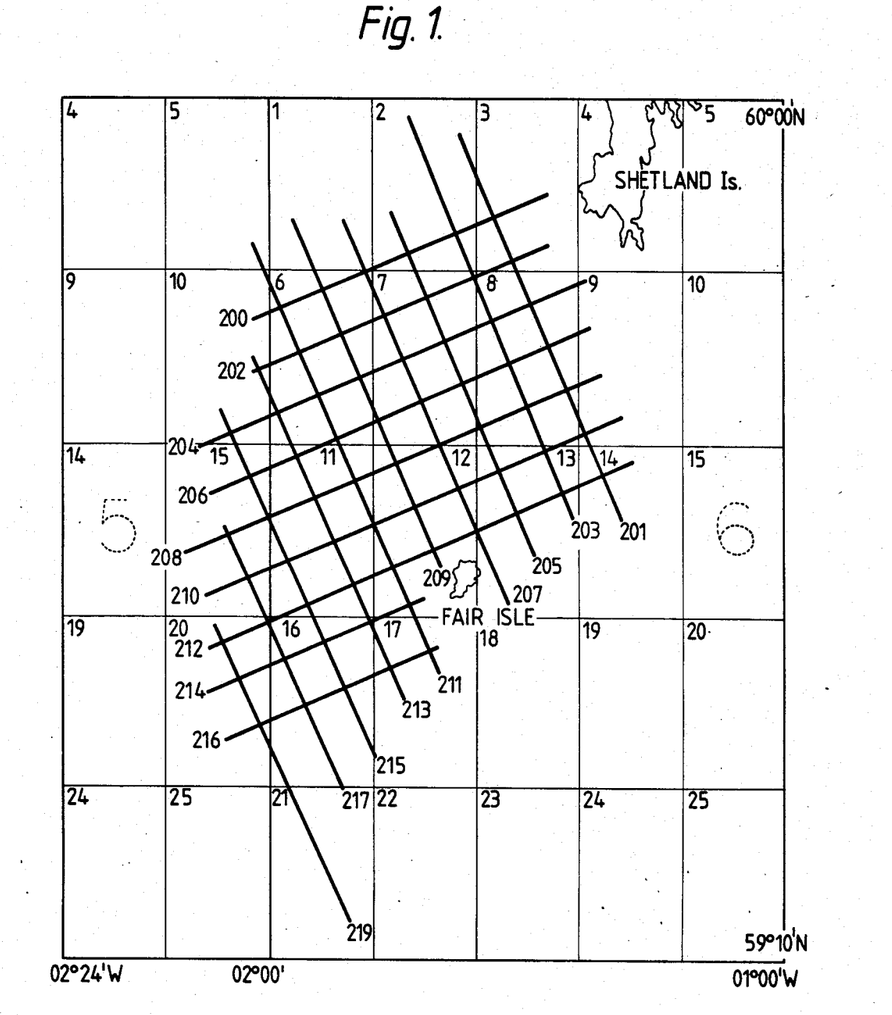
FIG. 1 is an example of the seismic survey of waters offshore of the United Kingdom.
Figure 2:
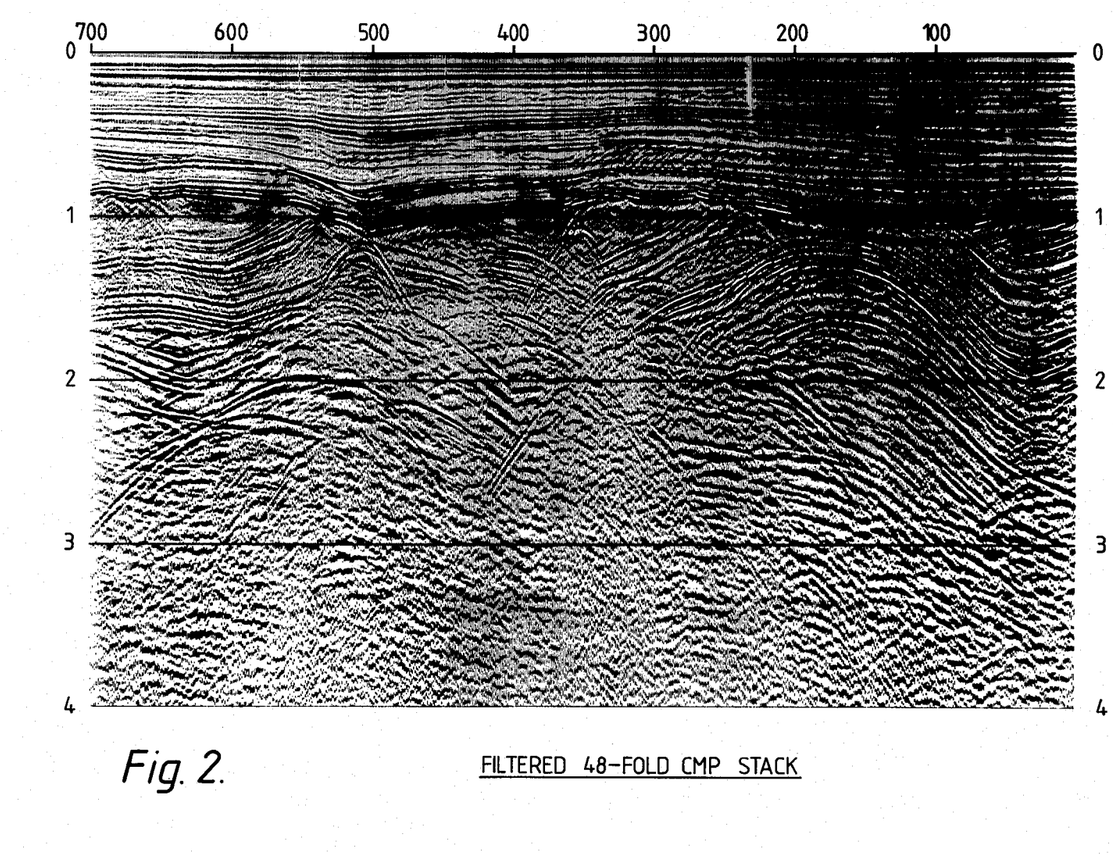
FIG. 2 is a representation of a filtered 48-fold CMP stack.

Conventional marine seismic surveys are conducted along widely spaced lines so as to cover a grid with perhaps 2 to 5 kms between profiles. FIG. 1 shows a typical seismic programme map. Recorded data from each line are processed independently to yield a seismic section such as that of FIG. 2, showing the reflection response of the subsurface to acoustic impulses as a function of 2-way reflection time and observation position along the line. Although having the appearance of a vertical cross section through the earth, such a simplistic view of the seismic display can be misleading where geologic structures are complicated. Reflected responses are not then registered in their correct spatial positions in the display. Gross geometrical distortion can arise due to focussing properties of reflecting surfaces and refraction effects in the overburden.

Figure 3:
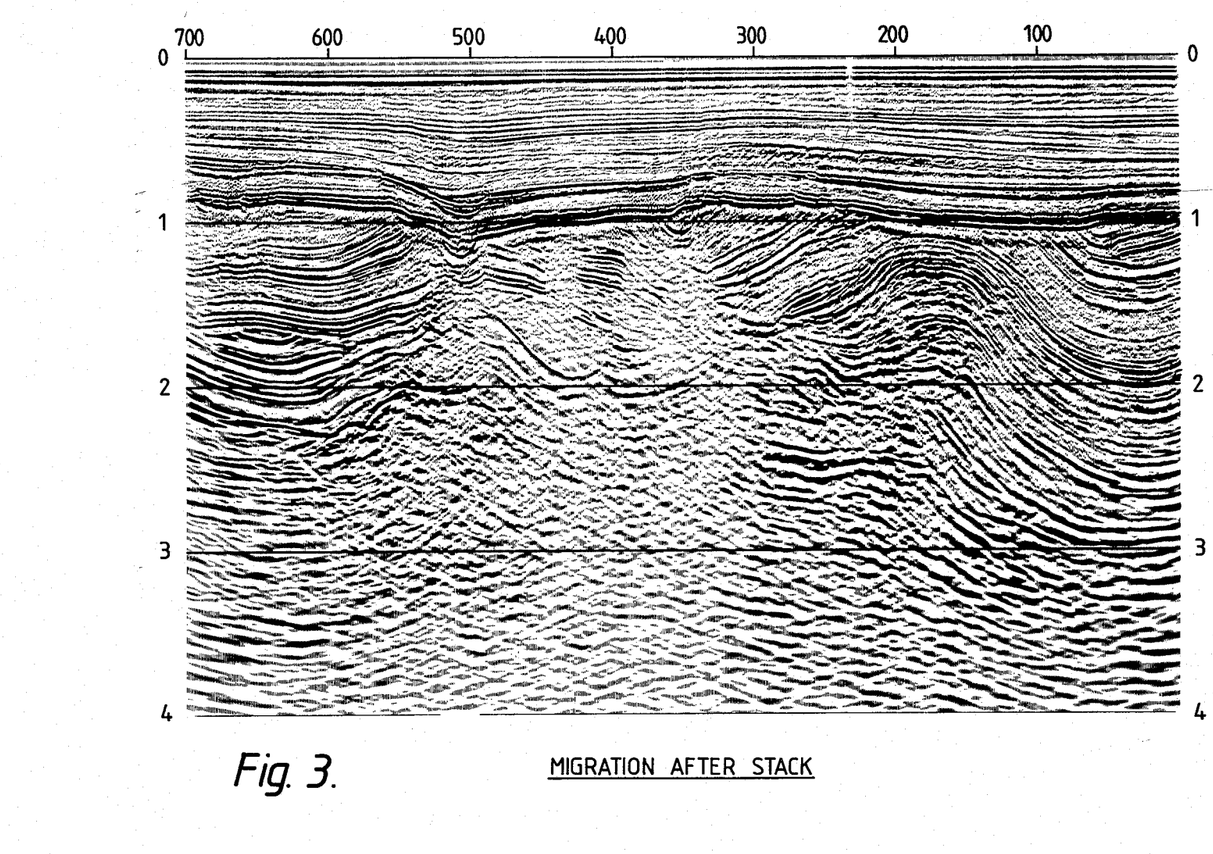
FIG. 3 is a representation of a migration after stack.

Migration is a computer processing technique that can be applied to a conventional seismic section to correct for geometrical distortion of reflected responses, but this can only be effective for responses that originate within the plane vertically beneath the surface seismic line. FIG. 3 shows a migrated version of the previous Figure, which responds well to this process. To overcome the problem of out-of-plane responses, seismic observations must be obtained over a densely sampled area of the earth's surface. Areal survey methods permit 3-dimensional treatment of the seismic data when these are processed in a computer, and are thus referred to as 3-D surveys. Commonly, observations must be obtained on a grid as fine as 25 m×25 m.

3-D marine seismic surveys are presently conducted using methods that are essentially those employed for conventional 2-D profiling but with considerable extra elaboration. Seismic detectors are distributed along a marine streamer typically about 2.5 km in length. Due to effects of wind, tides and currents, the towed streamer cannot exactly follow the course of the survey vessel but adopts a 'feathering' angle. A relatively small feathering angle of 5° means that the most distant detectors are offset more than 200 m from the axis of the ship's heading, which may itself depart from the bearing of the survey line. Precise knowledge of detector positions (up to 96 groups) at the instant of every seismic shot (every 25 m, or about 10 second intervals) is essential for effective 3-D processing, and is the reason for much of the additional elaboration in recording techniques.

The use of long marine streamers confers a number of benefits upon the seismic reflection method, some of which may be deemed indispensible for conventional 2-D profiling. By recording the responses at many independent groups of hydrophones for each seismic shot, the offset-dependence of reflection times can be observed. This is determined principally by the attitude of reflecting surfaces and by seismic wave propagation velocities. If shots are fired at distance intervals that are short in comparison with the streamer length, many responses are recorded that have different source-receiver offset distances but are centered about a common surface midpoint. By making the assumption that reflected responses relate to a point in the sub-surface vertically beneath the source-receiver mid-position, reflection time as a function of source-receiver offset distance may be interpreted to yield velocity information.

Recorded responses relating to a particular common source-receiver midpoint position are generally referred to (erroneously) as Common Depth Point (CDP) traces. If time adjustments are made to recorded data so as to compensate for the additional reflection ray path lengths incurred by source-receiver separation, the redundancy of information contained within each set of CDP traces can be exploited to improve signal-to-noise conditions.

In summary, CDP traces can be analysed to provide velocity information. An average of time-corrected traces (CDP stack) enhances primary reflections whilst attenuating multiple reflections and noise. However, the assumption that common midpoint traces equate with common depth point traces is strictly valid only for reflection from plane horizontal surfaces. In conventional seismic profiling, errors that arise from this assumption are generally outweighed by advantages of CDP stack except under circumstances of severe structural complexity.

3-D surveys always address problems of structural complexity and situations where sharp spatial and temporal resolution is of paramount importance. It is then prudent to question the applicability of CDP stack methods to 3-D surveys and to look for more satisfactory operating methods.

Errors occur in the asusmptions underlying the CDP technique. These concern the dispersal of sub-surface ray path reflection points in consequence of source-receiver offset and the inclination of reflecting surfaces.

DETAILED DESCRIPTION OF THE INVENTION AND PREFERRED EMBODIMENT

Figure 4:
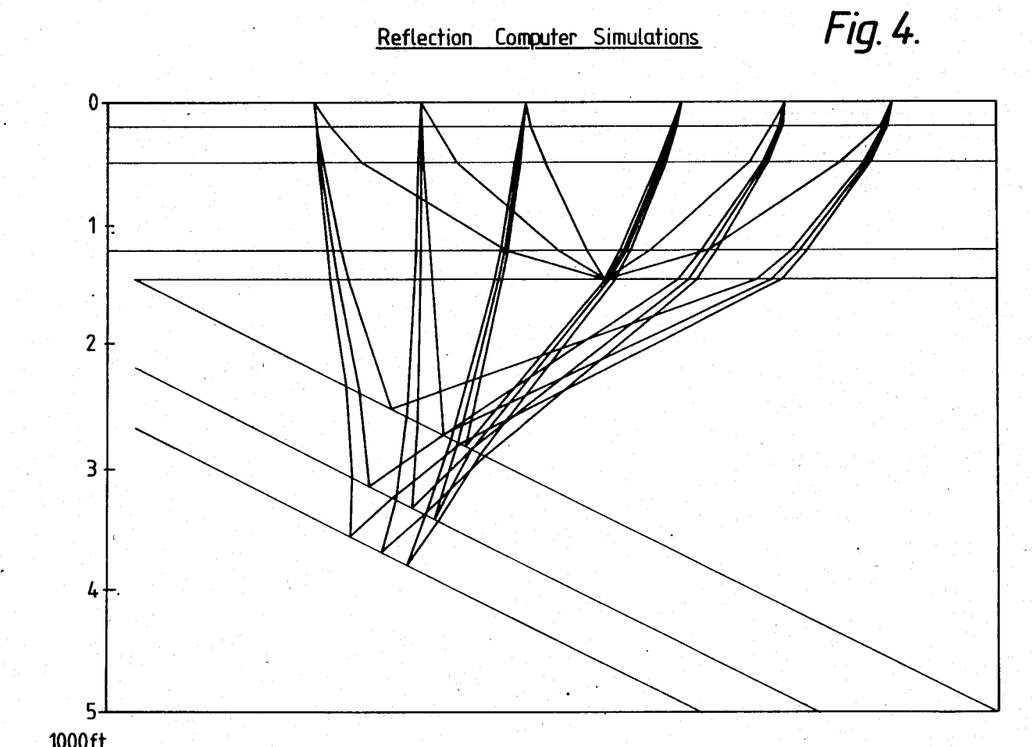
FIG. 4 is a computer simulation that shows a family of CDP ray paths.

FIG. 4. is a computer simulation that shows a family of CDP ray paths and clearly reveals the scatter of reflection points along dripping sub-surface boundaries. If we apply time corrections to compensate ray path obliquity and then average the CDP traces we combine reflected responses from different regions of the sub-surface.

Figure 5:
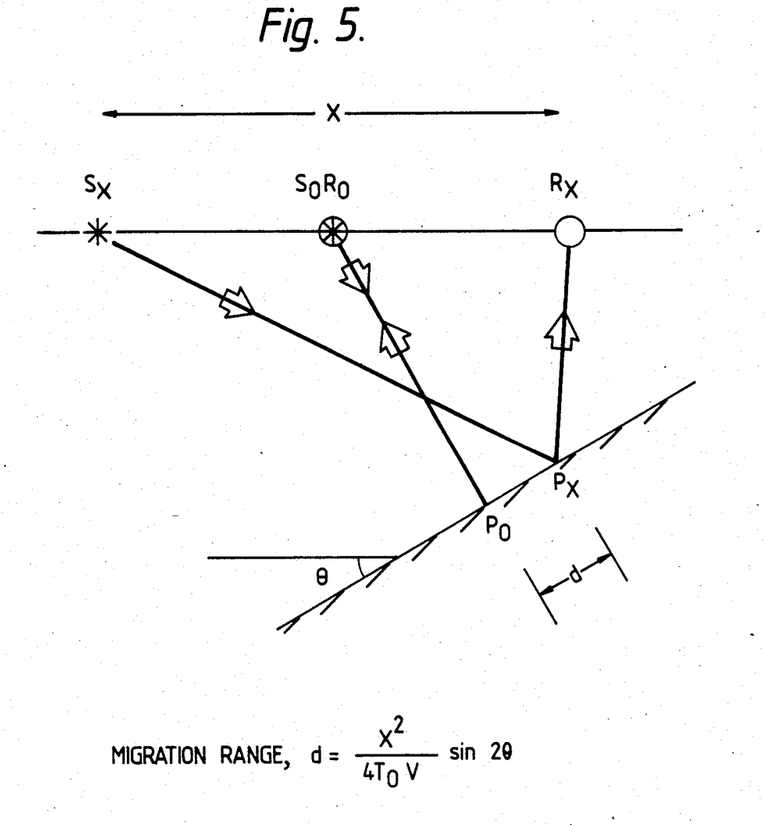
FIG. 5 is a representation of a dimensional relationship for the best case situation of constant overburdened velocity and a plane reflecting surface inclined as an angle zero.
Figure 6:
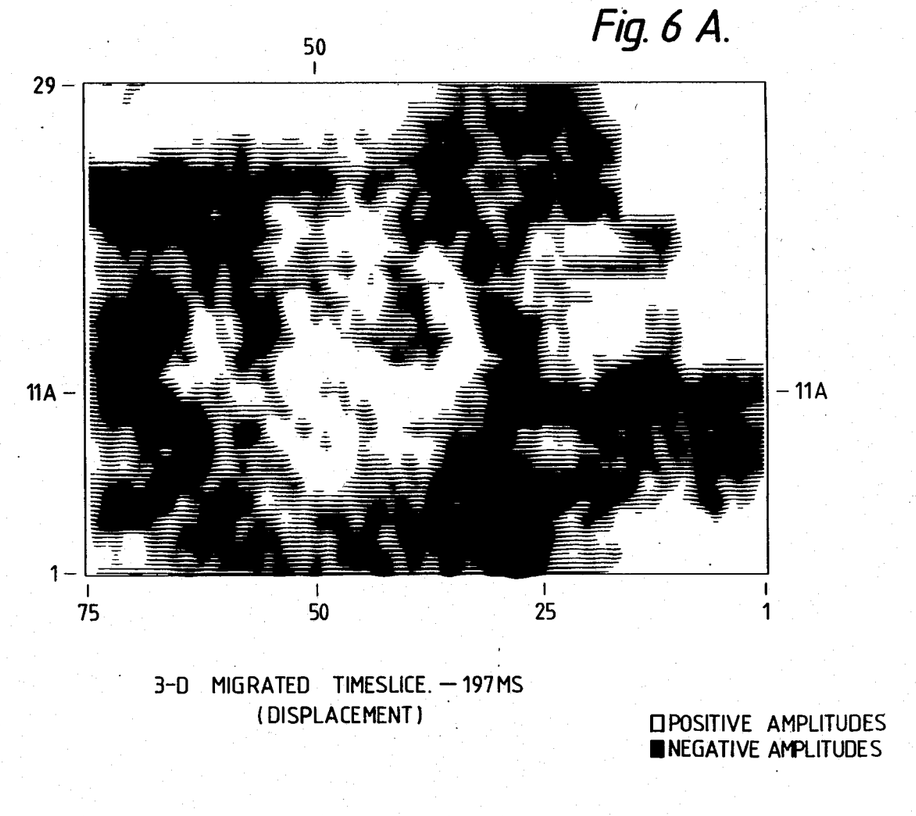
FIG. 6A is a 3-D migrated timeslice of 197 milliseconds.
FIG. 6B is a seis cube display.

FIG. 5 gives dimensional relationships for the best-case situation of constant overburden velocity and a plane reflecting surface inclined at an angle $\theta$ (theta). Substituting typical values of, say, velocity $V = 3000$ m/sec, $X = 2500$ m, normal incidence reflection time $T_o = 2$ seconds and dip angle $\eta(\text{theta}) = 10°$, it is seen that a range of offset distances of 2500 m results in a sub-surface scatter (migration range) of 90 m. Arbitrarily curved reflecting surfaces and inhomogeneity in overburden velocities can increase this range dramatically.

CDP methods require long marine streamers. Detector group positioning relies upon in-streamer compasses an advanced real-time navigation computers on the seismic vessel, over and above the stringent requirements for vessel navigation. The survey method is inherently unwieldy in the presence of existing marine structures, such as drilling platforms, or in areas of high shipping activity. A distance of several kilometers surrounding the actual prospect area must be clear for manouvering so as to enter each seismic line with the streamer correctly deployed.

The data processing sequence must adhere to a pattern that is dictated by the needs for CDP stack. The entire field programme must be completed before the final CDP stack geometry can be determined. This involves the assignment of every recorded trace to an elemental area, or 'bin', containing the computed midpoint location. Once this has been established the data must be analysed to derive CDP stack corrections. Only when the CDP stack has been accomplished can consideration be given to the final major step of 3-D migration. Commonly, the lead time between completing a field survey and production of 3-D migrated displays can extend to 12 months of elapsed time.

The migration process seeks to reconstruct, from observations made near the surface of the earth, the configuration of reflecting surfaces at depth. All conventional migration schemes regard the seismic observations as measurements of an emerging acoustic wavefield that could equivalently have been generated by simultaneous initiation of a distribution of point sources located on every buried reflecting surface. From estimates of seismic propagation velocities the location of these hypothetical acoustic sources, and hence of the reflecting surfaces, can then be determined by downwardly continuing the observed wavefield. Some methods accomplish this iteratively, as a layer stripping process, whereas other methods are one-step processes.

An important implication of this imaging procedure is that observed waveforms correspond to normal-incidence reflection traces, i.e. responses observed with zero separation between sources and receivers. As applied to CDP stack data this is equivalent to assuming that source-receiver offset effects are completely compensated simply by the time-correction procedures employed in performing the stack. This assumption is not valid.

Several alternative algorithms are available for migrating seismic data. All require knowledge of the subsurface velocity field. All are based upon some version of the acoustic wave equation. Some algorithms use finite differences, or a frequency domain equivalent, in obtaining a direct solution of the second order differential equations. Other algorithms are based upon an integral formulation, which is a rigorous mathematical statement of Huygen's principle as developed by Kirchhoff.

Various commercial migration programmes differ in the approximations that reside in the algorithm used, in the fiedlity of response to signal, in the response to noise, and in the computer hardware that is required for efficient implementation of the chosen algorithm. None is inherently 'correct' or entirely unambiguous in its imaging capability.

Commercial programmes presently available require that the complete seismic data set is available before imaging can commence. Ordinarily this is no disadvantage as much analysis and pre-processing must be performed in preparing a CDP stack section prior to migration.

3-D seismic methods are in an early stage of development and are seen as having evolved by simple adaptation of the accepted methods for 2-D profiling. Published results have demonstrated that enormous benefits can be derived in terms of clarification of gross geological structure.

It is nevertheless inevitable that the CDP stack technique must impose a limit upon the resolution that can be attained in 3-D imaged data over and above that which is imposed by uncertainties in positioning or by earth filtering effects. Moreover, the requirements for recording CDP data make the acquisition procedure unwieldy and expensive with a high risk of equipment malfunction in consequence of the elaborate instrumentation that is required. Long lead times to a fully processed result are unavoidable as imaging cannot commence until the entire acquisition phase and conventional CDP stack have been completed.

This invention proposes a scheme that is unique in that imaging can commence with the first seismic shot, gradually building up the sub-surface picture as the survey progresses. This approach is essential for any system that is to have a potential for real-time imaging.

The ideal input for seismic migration programmes are normal incidence reflection traces, i.e. observations recorded with zero-offset between the seismic source and seismic detector. In practice a fixed offset of one or two hundred meters is entirely acceptable for deep reflection work and eases a number of physical and instrumental constraints relating to ambient noise levels and signal dynamic range.

Zero-offset traces are ideally suited for deconvolution processes which are designed to enhance the resolution of reflected wavelets and to attenuate short period multiple reflections. They are also the required input to seismic trace inversion schemes which derive acoustic impedance estimates directly from reflected signals.

From these fundamental considerations a greatly simplified survey technique has, in accordance with this invention, been devised. The observations essential in this invention for recording 3-D data may be acquired using a single seismic source-receiver pair. More particularly, according to one aspect of the present invention, there is provided a method of under water seismic testing, which comprises:

(a) traversing the region of interest with a survey vessel while firing a single seismic source repeatedly at regular and/or predetermined intervals;

(b) observing or recording the sub-sea response to the repeated shots from the seismic source using a single seismic receiver to produce thereby single-trace data; and (c) subjecting the single-trace data to signal processing in conjunction with data relating to the seismic velocity distribution in the region of interest to generate thereby sub-sea geological data.

Data relating to the seismic velocity distribution in the region of interest may already be known or, if it is not known, may first be determined as a primary step forming part of the method of this invention.

Conveniently, the signal processing in step (c) above is effected in two stages, the first being to effect deconvolution and the second being "3-D" imaging. This latter stage of processing is preferably carried out using the Kirchoff integral formulation.

Practical advantages are immediately apparent and far reaching. Removing the long multi-trace streamer also obviates the need for streamer position monitoring with all of its complications and susceptibilities to errors. The streamer itself is the most vulnerable single item of the entire seismic instrumentation and a major source of problems. Conventional multi-channel recording instruments also become obsolete with single trace recording.

Many prospect areas become accessible for 3-D surveys when the conventional streamer is eliminated. Manoeuverability of the survey vessel is greatly improved. In the longer term, smaller vessels can be equipped that are capable of operating closer to shore, to computer processing with possible greater impact. The volume of data acquired from each seismic shot is reduced by approximately two orders of magnitude. The 4.6 million bits commonly recorded every 10 seconds from a 96 trace streamer are reduced to a mere 48,000 bits. Such volumes can be comfortably transmitted via existing satellite links to shore-based computer centres whilst the survey is in progress.

If we can dispense with the CDP stack the computer processing requirements prior to imaging are further reduced by several orders of magnitude. Sorting the data into CDP families on an areal basis ('binning') is not required. The spatial blurring and inevitable errors associated with binning are also avoided. Time consuming analysis of data to determined CDP stack corrections is likewise avoided. Signal manipulation and pre-processing routines such as demultiplex and deconvolution before stack are eliminated (deconvolution on single-trace data equating with the customary deconvolution after stack on CDP data). These two operations together account for more than half the total computer time spent in processing conventional CDP marine data. Moreover, none of these essential tasks can commence until the survey is complete and the recorded data received at the processing centre.

A 10 km × 10 km 3-D survey will commonly yield some 2000 line-kilometers of conventional CDP profiles. This would normally require several months of concerted effort (a few man/years) to reduce to CDP stack from suitable for input to the machine intensive 3-D migration phase.

The signal processing envisaged in the present invention for single trace recordings is restricted to deconvolution, followed immediately by 3-D imaging. The computer time required for deconvolution is measured in tens of milliseconds per trace and can be accomplished on-line. The entire processing operation could be completed under the control of one experienced processing geophysicist, adding greatly to the integrity of the result.

Two alternative approaches to 3-D imaging are now proposed in accordance with this invention, one of these being available with present technology. Both are based upon the Kirchhoff integral formulation as this is seen to have distinct advantages in terms of signal-to-noise criteria, and this is the only route that appears to lead ultimately to a real-time imaging capability.

As applied to sample seismic data, the Kirchhoff integral approach reduces to a summation of discrete sample values that occur over hyperboloidal surfaces within a 3-D data set. Some further computationally trivial spectral and amplitude weighting operations are also involved. By reformulating the equations appropriate samples can be added into store as new data is acquired, thus avoiding the requirement for a complete data set before imaging can commence.

A first method for reducing the 3-D imaging problem to manageable proportions accomplishes the summations in two steps, performing summations in two mutually orthogonal directions to obtain a result that is equivalent to summing over an area. The equivalence is exact for constant seismic propagation velocities, otherwise it is in error to a degree that depends upon the severity of velocity heterogeneity.

Existing computer technology is such that the first step in this approach can be accomplished, without recourse to main-frame machines, within a time scale similar to that of acquiring the data. For an areal survey of square dimensions the second stage of the two-step method would be possible within a time at worst comparable to that required to conduct the survey, i.e. a few weeks.

The ultimate aim of accomplishing a full migration in a single step and in real-time is considered entirely feasible with development of specific hardware. The arithmetic requirements are comfortably within the capabilities of current array processors. Problems to be overcome concern rapid addressing and accessing large data arrays. The solution to these problems will exploit the regular symmetry and massive redundancy inherent in the data.

An apparent weakness in the above proposals is that knowledge of the seismic velocity distribution is an essential input to the migration process, whereas this information is usually derived from studies of the CDP data that is subsequently imaged. The methods of this invention is not expected to displace conventional CDP profiling for reconnaissance and semi-detailed surveys. CDP profiles will define prospective geological structures in broad outline, whilst simultaneously providing the raw material for velocity estimates needed for subsequent 3-D investigations.

In the event that velocity errors arise during the imaging process of this invention, as they inevitably do in existing schemes, residual migration is proposed for remedial purposes. This requires significantly less computational effort than a complete re-migration from scratch. Used selectively in a reiterative mode, residual migration would also serve to confirm the velocities needed for depth conversion. The aim would be to iterate the velocity parameter so as to optimise the focus at different time levels. Critical focus should be observed more clearly with the spatial resolution available from short-offset recording.

A further major role of the prior art CDP stack is to improve the signal-to-noise ratio of primary reflections with respect to ambient noise. The pressure amplitude in a seismic wave decays progressively with distance travelled, until eventually it falls beneath a level determined by ambient noise conditions. The most important single factor contributing to this decay is the spherical spreading effect. More correctly this is termed divergence loss as propagating wavefront surfaces are not in general strictly spherical.

Figure 7:
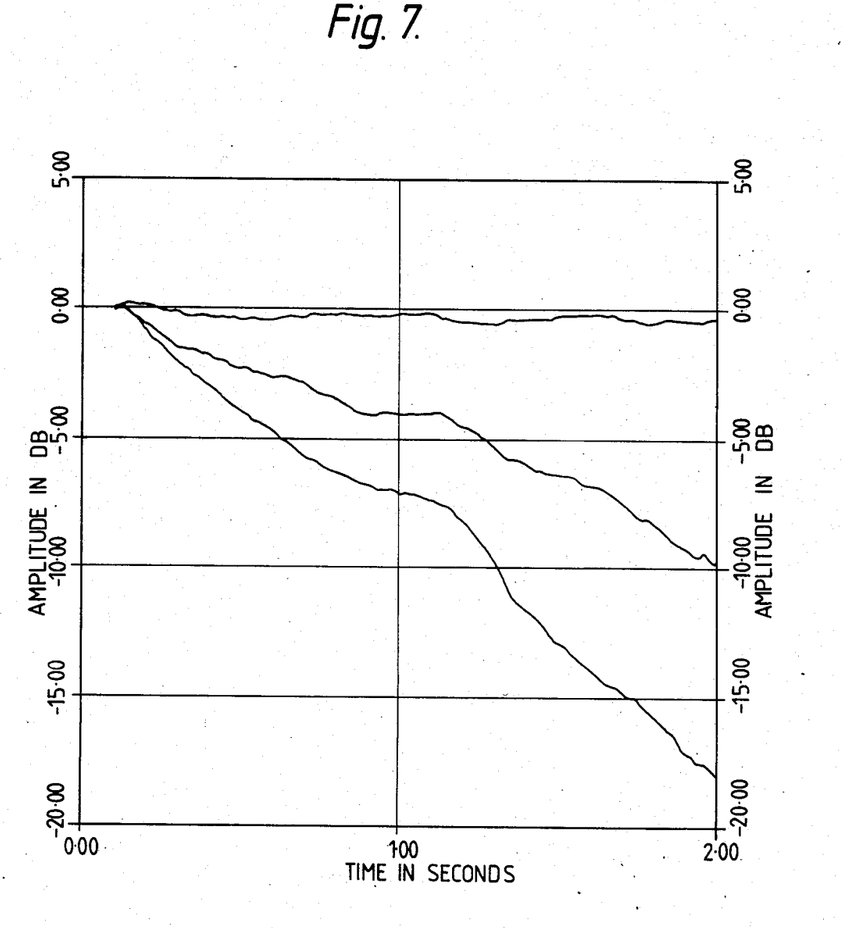
FIG. 7 is a graph of an experiment showing the relative amplitude of random noise on input to migration.

A property of Kirchhoff migration that has not hitherto been appreciated is that it incorporates an inverse for divergence loss as well as for the focussing effects and geometrical distortions that are generally the motivating reasons for applying migration. Then, to the extent that divergence loss is the principal cause of signal amplitude decay, if a short-offset recording has adequate signal-to-noise ratio at early reflection times this should be equally so at late reflection times. We have found that in practical experiments with scale model data acquired at ultrasonic frequencies in a water tank, significant benefits can be achieved. FIG. 7 illustrates the results obtained from such an experiment, showing an 18 dB boost in signal-to-noise ratio at 2 seconds reflection time resulting from the 3-D migration process. This degree of enhancement with respect to random noise is equivalent to the best achievable result to be expected from a 64-fold CDP stack. It follows that if a 24 or 48-fold CDP stack provides adequate signal-to noise ratios in conventional 2-D profiles, single trace recordings should be more than adequate input for 3-D imaging.

A further major benefit of the prior art CDP stack is the attenuation provided against long-period multiple reflections. There is a considerable body of theory relating to multiple elimination through wavefield extrapolation techniques. Some proposals consider this function an integral part of the migration process. In order to succeed using assumptions of linear acoustic wave theory, the ideal input data would be normal-incidence reflection traces properly compensated for divergence loss, such as would result from the 3-D recording proposal of this invention.

I claim:

1. A method of underwater seismic investigating, which comprises:
    (a) determining seismic velocity distribution data in the region of interest;
    (b) traversing the region of interest with a survey vessel towing a single seismic source-receiver pair with a fixed separation between said source and said receiver;
    (c) firing said single seismic source repeatedly at predetermined intervals;
    (d) recording the sub-sea response to the repeated firings of said seismic source using said single seismic receiver to produce thereby single-trace data; and
    (e) subjecting said single-trace data and said seismic velocity distribution data in the region of interest to signal processing comprising a first deconvolution stage and a second 3-D imaging stage to generate thereby detailed sub-sea geological data.

2. A method according to claim 1, wherein said second "3-D" imaging stage, signal processing is carried out using the Kirchoff integral formulation.

3. A method according to claim 2, wherein said Kirchoff integral formulation comprises performing summations in two mutually orthogonal directions to obtain a summation which is equivalent to summing over an area at constant seismic propagation velocity.

* * * * *

UNITED STATES PATENT AND TRADEMARK OFFICE
CERTIFICATE OF CORRECTION

PATENT NO. : 4,682,307
DATED : 21 July 1987
INVENTOR(S) : Paul Newman

It is certified that error appears in the above-identified patent and that said Letters Patent is hereby corrected as shown below:

In column 2, line 29, "asusmptions" should be --assumptions--.

In column 2, line 37, "CMP" should be --CDP--.

In column 2, line 66, "angle $\eta$" should be --angle $\theta$--.

In column 3, line 6, "an" should be --and--.

In column 3, line 64, "fiedlity" should be --fidelity--.

In column 4, line 50, delete "More partic-".

In column 4, delete lines 51-64.

In column 5, line 15, after "Many" insert --more--.

In column 5, line 19, after "shore," insert --in confined waters, or in close proximity to drilling structure. It is not unrealistic to expect that surveying speeds may be increased by 50% with careful attention to streamer noise characteristics, whilst down-time lost in turning onto line would be virtually eliminated. Time lost in retrieving and deploying the streamer in marginal weather conditions would also be dramatically cut.

UNITED STATES PATENT AND TRADEMARK OFFICE
CERTIFICATE OF CORRECTION

PATENT NO. : 4,682,307

DATED : 21 July 1987

INVENTOR(S) : Paul Newman

It is certified that error appears in the above-identified patent and that said Letters Patent is hereby corrected as shown below:

Still in the longer term, cost benefits accruing from the simplified survey technique could make it feasible to image every potential oil-bearing structure in a petroleum province such as the North Sea, with enormous reductions in exploration risks.
    Advantages of single-trace recording carry through--.

In column 5, line 34, "determined" should be --determine--.

In column 5, line 49, "from" should be --form--.

In column 6, line 59, "progresively" should be --progressively--

Signed and Sealed this

Twenty-sixth Day of January, 1988

Attest:

DONALD J. QUIGG

Attesting Officer      Commissioner of Patents and Trademarks